United States Patent
Tatarchuk et al.

(10) Patent No.: US 8,420,023 B2
(45) Date of Patent: Apr. 16, 2013

(54) MICROFIBROUS MEDIA AND PACKING METHOD FOR OPTIMIZING AND CONTROLLING HIGHLY EXOTHERMIC AND HIGHLY ENDOTHERMIC REACTIONS/PROCESSES

(75) Inventors: Bruce Tatarchuk, Auburn, AL (US); Hongyun Yang, Auburn, AL (US); Ranjeeth Kalluri, Morrisville, NC (US); Donald Cahela, Auburn, AL (US)

(73) Assignees: Auburn University, Auburn, AL (US); Intramicron, Inc., Auburn, AL (US)

( * ) Notice: Subject to any disclaimer, the term of this patent is extended or adjusted under 35 U.S.C. 154(b) by 54 days.

(21) Appl. No.: 12/940,792

(22) Filed: Nov. 5, 2010

(65) Prior Publication Data
US 2011/0135543 A1 Jun. 9, 2011

Related U.S. Application Data

(60) Provisional application No. 61/258,741, filed on Nov. 6, 2009.

(51) Int. Cl.
*B01J 8/02* (2006.01)
*B01J 19/00* (2006.01)

(52) U.S. Cl.
USPC ............ 422/211; 422/222; 422/310; 422/198

(58) Field of Classification Search ............ 422/211, 422/222, 310, 198
See application file for complete search history.

(56) References Cited

U.S. PATENT DOCUMENTS

| | | | |
|---|---|---|---|
| 3,849,076 A | 11/1974 | Gryaznov et al. | |
| 4,101,287 A | 7/1978 | Sweed et al. | |
| 4,224,983 A | 9/1980 | Thurston et al. | |
| 4,300,956 A | 11/1981 | Rosenberger et al. | |
| 5,080,872 A | 1/1992 | Jezl et al. | |
| 5,080,963 A | 1/1992 | Tatarchuk et al. | |
| 5,096,663 A | 3/1992 | Tatarchuk et al. | |
| 5,102,745 A | 4/1992 | Tatarchuk et al. | |
| 5,293,742 A | 3/1994 | Gillingham et al. | |
| 5,304,330 A | 4/1994 | Tatarchuk et al. | |
| 5,800,790 A * | 9/1998 | Imamura et al. | ............ 422/174 |
| 6,231,792 B1 | 5/2001 | Overbeek et al. | |
| 6,869,578 B1 | 3/2005 | Herbert et al. | |

(Continued)

FOREIGN PATENT DOCUMENTS

| | | | |
|---|---|---|---|
| EP | 0308034 A2 | 3/1989 | |
| GB | 2204055 A | 11/1988 | |
| WO | 0194006 A2 | 12/2001 | |

OTHER PUBLICATIONS

Groppi, Gianpiero et al., "Honeycomb supports with high thermal conductivity for gas/solid chemical processes" Catalysis Today, www.elsevier.com/locate/cattod, pp. 297-304, Jul. 11, 2005.

(Continued)

*Primary Examiner* — Walter D Griffin
*Assistant Examiner* — Lessanework Seifu
(74) *Attorney, Agent, or Firm* — Haverstock & Owens LLP

(57) ABSTRACT

A vessel packed with a microfibrous media made of micron-sized highly conductive fibers, which are able (and may be used) to immobilize various reactive materials including catalysts, sorbents, electrocatalysts, and other chemically reactive solids. The vessel enables fine temperature control and a uniform temperature profile for a range of highly endothermic or exothermic chemical reactions, sorptions, separation processes, mixing operations, and heat transfer applications.

47 Claims, 4 Drawing Sheets

U.S. PATENT DOCUMENTS

| | | |
|---|---|---|
| 6,881,703 B2 | 4/2005 | Cutler et al. |
| 7,084,180 B2 | 8/2006 | Wang et al. |
| 7,226,574 B2 | 6/2007 | Long et al. |
| 7,294,734 B2 | 11/2007 | Brophy et al. |
| 7,501,012 B2 | 3/2009 | Tatarchuk et al. |
| 7,608,344 B2 | 10/2009 | Abbott, III et al. |
| 2002/0068026 A1 | 6/2002 | Murrell et al. |
| 2004/0150122 A1 | 8/2004 | Engh et al. |
| 2005/0169820 A1* | 8/2005 | Tatarchuk et al. ............ 422/177 |
| 2006/0159916 A1 | 7/2006 | Dubrow et al. |
| 2008/0229766 A1 | 9/2008 | Sharma |
| 2009/0017363 A1 | 1/2009 | Niu et al. |

OTHER PUBLICATIONS

Tronconi, Enrico et al., Monolithic catalysts with 'high conductivity' honeycomb supports for gas/solid exothermic reactions; characterization of the heat-transfer properties, pp. 4941-4949, Aug. 26, 2004.

* cited by examiner

MICROFIBROUS MEDIA AND PACKING METHOD FOR OPTIMIZING AND CONTROLLING HIGHLY EXOTHERMIC AND HIGHLY ENDOTHERMIC REACTIONS/PROCESSES

CROSS-REFERENCE TO RELATED APPLICATION(S)

This application claims priority under 35 U.S.C. §119(e) of the U.S. Provisional Patent Application Ser. No. 61/258,741, filed Nov. 6, 2009 and titled, "MICROFIBROUS ENTRAPPED CATALYSTS FOR OPTIMIZING AND CONTROLLING HIGHLY EXOTHERMIC AND HIGHLY ENDOTHERMIC REACTIONS." The Provisional Patent Application Ser. No. 61/258,741, filed Nov. 6, 2009 and titled, "MICROFIBROUS ENTRAPPED CATALYSTS FOR OPTIMIZING AND CONTROLLING HIGHLY EXOTHERMIC AND HIGHLY ENDOTHERMIC REACTIONS" is also hereby incorporated by reference in its entirety for all purposes.

The U.S. Government has a paid-up license in this invention and the right in limited circumstances to require the patent owner to license others on reasonable terms as provided for by the terms of Contract No. N00014-07-M-0393 awarded by the United States Office of Naval Research.

FIELD OF THE INVENTION

The invention relates to a packed vessel that is able to be used to carry out highly exothermic or highly endothermic reactions or processes that utilize fine temperature control. The present invention relates to the processes which use the packed vessel to carry out the reactions and processes mentioned herein.

BACKGROUND OF THE INVENTION

Exothermic reactions and processes such as Fischer-Tropsch, and methanol formation from syngas, ethylene oxidation, maleic anhydride, phthalic anhydride, formaldehyde, acrylonitrile, acrylic acid, 1,2-dichloroethane, vinyl chloride, air compression, concentrated acid dilution, vapor condensation and others are strongly exothermic. Endothermic reactions and processes such as steam methane reforming and evaporation and others are strongly endothermic. Efficient heat transfer from/to reaction zone is required to improve the product selectivity, catalyst life and operational safety. A well-known reactor, the multi-tube reactor in a tube-and-shell configuration, has been used for highly exothermic or highly endothermic reactions. It is similar to a tube-and-shell heat exchanger, as shown in European patent No. 0,308,034. It consists of a number of thin tubes (usually less than 2 inches) in which catalyst particles are filled. These tubes are surrounded by cooling fluids, which pass through the shell side of the heat-exchanger-like reactor. Due to the high surface to volume ratio of the thin tubes, efficient heat exchange is able to be achieved. However, this design faced severe scale-up issues. At a larger scale, more thin tubes are required. The increasing part count makes the manufacture of such types of reactors very difficult and expensive, especially at large scales.

There were reactor designs that allow heating or cooling fluids passing through the tube side, and catalyst particles filled within space between shell and tubes. These designs are able to simply solve the scale-up issue of multi-tubular reactors, however, at the cost of heat exchanging efficiency. In this design family, different types of geometries of tubes have been used to improve heat exchanging efficiency, as shown in previous patents GB 2,204,055, U.S. Pat. Nos. 4,224,983, 5,080,872; different flow directions were also chosen for better heat exchanging performance.

These reactor designs, no matter how different they look, share one common structural characteristic: the reaction zone and heat exchanging zone are separated by tube walls. Therefore, these reactors are able to be classified as reactors with external heat exchanging.

Several new catalyst/reactor structure designs have been developed to improve the intra-bed heat transfer. The first approach is wash-coated monolithic catalyst structure, including metal honeycomb structure (U.S. Pat. Nos. 3,849,076; 4,101,287; 4,300,956; 6,869,578), metal monolith extrusion structure (U.S. Pat. Nos. 6,881,703; 7,608,344) and metal microchannel reactor (U.S. Pat. Nos. 7,084,180; 7,226,574; 7,294,734). This approach wash-coats a thin layer of catalyst on the internal wall of the monolithic structures. These structures made of thermal conductive materials (mainly metals or metal alloys) transfer heat fast from/to the reaction zone. Some of the catalyst structures have thick channel walls that allow heat exchanged on their external surfaces. For example, a catalyst structure (U.S. Pat. No. 7,608,344) is made by extrudating copper powders and then structure is formed by sintering or annealing in reducing environments. Copper forms a continuous phase that provides a very high thermal conductivity (e.g. 200 W/K-m), which equals to the product of bulk copper thermal conductivity and copper volumetric fraction (G. Groppi and E. Tronconi). The copper honeycomb structure transfers the heat from the wash-coated catalyst inside channel walls to the external honeycomb surface in an efficient way. Other monolithic or channel structures (U.S. Pat. Nos. 3,849,076; 4,101,287; 4,300,956; 6,869,578, 7,084,180; 7,226,574; 7,294,734) have thin channel walls and small channel sizes (usually several millimeters or less). In these cases, some channels have hot fluid and cold fluid passing through different channels next or cross to each other using the thin walls to separate the fluids and transfer heat. This design minimizes the heat transfer distance (resistance) and provides superior heat transfer performance at the cost of reactor complexity and reliability. In a word, the wash-coated monolithic structures significantly improve the heat transfer by reducing the heat transfer resistance and increasing the heat exchanging area. However, this wash-coated monolith approach, due to the nature of wash-coating, only allows a thin film of catalyst loaded inside the reactor channel. A typical catalyst volume loading is much less than 3 vol. %; some monolithic structures with small channel size (e.g. less than 1 mm) are able to reach a catalyst loading of 3-8 vol. %. Moreover, the mass transfer only take place by molecular diffusion in radial direction, which is much slower than the mass transfer in typical packed bed where bulk gas diffusion is dominant. The limited catalyst loading and low mass transfer rate results in slow reaction kinetics.

Another approach uses metal microfibrous media with catalyst entrapped for fast heat transfer. This type of media was first developed by Tatarchuk in 1992 (U.S. Pat. Nos. 5,080,963, 5,096,663). The media had good electrical conductivity and was developed as electrode materials for supercapacitors and fuel cells. Due to the similarity, the thermal conductivity of the materials should be predictable. Since 1994, this media has been modified for catalytic processes (U.S. Pat. Nos. 5,102,745, 5,304,330, 6,231,792, 7,501,012) and sorbent processes. In 2001, a novel reactor design with a folded microfibrous media sheet, which was parallel to the flow direction was proposed for fast heat transfer. This design also suffers from the slow radial molecular diffusion limit due to its parallel flow pattern. Moreover, the porous media only take negligible amount of reactor volume. Considering the low volume fraction of catalyst in this microfibrous media, the overall catalyst loading in the reactor will be extremely low. The folded structure has only several edge contacts with the reactor wall for heat transfer. This means the effective heat exchanging area is very limited. These drawbacks make the design much less competitive compared to the monolithic approach.

SUMMARY OF THE INVENTION

A microfibrous media made of micro-sized highly conductive fibers, which is able to entrap various catalyst material inside and form microfibrous entrapped catalyst, is a general catalyst carrier with enhanced intra-bed heat transfer characteristics. A sorbent or an electrocatalyst is able to be entrapped within the microfibrous media instead of the catalyst. Microfibrous entrapped catalysts demonstrated more than 45 times higher thermal conductivity and more than 10 times higher heat transfer co-efficient than a traditional packed bed due to the use of highly conductive micron-sized metal fibers made of copper, silver, aluminum, nickel, and others, and improved wall contacting. Because microfibrous media entraps fine catalyst particles, the microfibrous entrapped catalysts demonstrated similar reaction rate at a much lower catalyst loading than the traditional packed bed. By changing the active entrapped catalyst, microfibrous media is able to be applied to different highly exothermic and highly endothermic reactions/processes, and reactions/processes that utilize fine temperature control or uniform temperature profile.

DETAILED DESCRIPTION OF THE PREFERRED EMBODIMENT

Figure 1:
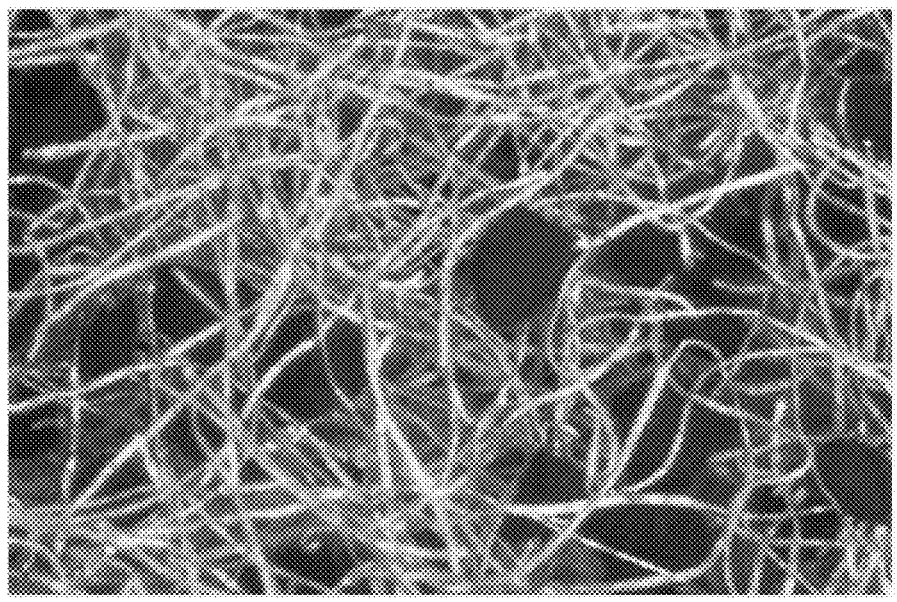
FIG. 1 illustrates a photo of a microfibrous media and microfibrous entrapped catalysts according to some embodiments.

The present invention focuses on improving the intra-bed heat exchanging efficiency and maintaining high catalyst, sorbent or electrocatalyst loading. In some aspects, catalysts, sorbents and electrocatalysts are all referred to generically as thermal facilitators. Although catalysts are typically described herein, in some embodiments, sorbents and/or electrocatalysts are used in addition to or instead of catalysts. The invention employs microfibrous media made of micro-sized fibers of high thermal conductivity to transfer heat. The media is inserted into the reaction zone under physical compression. Due to the compression and its flexibility, the media well touches the reactor internal wall and utilizes the entire reactor internal wall for heat exchanging. More importantly, the metal microfibrous network made of highly conductive metals, where catalytic materials are entrapped, provides fast paths to transfer heat from catalyst particles to the reactor wall in case of exothermic reaction. The fluid perpendicularly or near-perpendicularly passes through the microfibrous media. This flow direction enables accelerated heat and mass transfer due to bulk diffusion. As a result, this catalyst structure is able to provide enhanced mass transfer rate, high activity catalyst loading, large heat exchanging area and low heat transfer resistance.

The present invention is able to be referred to as a reactor with optimized intra-bed heat exchanging. The invention is able to be combined with the reactors with external heat exchanging for the ultimate heat exchanging performance. In the invention, the highly exothermic or highly endothermic reactions take place on the catalysts particles entrapped within the microfibrous network, or the reactions take place on the surface of metal fibers. The microfibrous entrapped catalysts are loaded in the reactors for highly exothermic and high endothermic reactions. The microfibrous entrapped catalysts are flexible; they are able to match the shape of reactor and contact with the metal reactor wall very well. Moreover, the metal fibers are typically made of highly thermally conductive metals such as silver, zinc, copper, aluminum and other metals. Thus the metal fibers behave as a bridge that transfers the heat generated from the catalysts particles, where reaction takes place, to a cold reactor wall for highly exothermic reactions; and transfer the heat from the hot reactor wall to catalyst particles or metal fibers for highly endothermic reactions. The present invention is able to also be applied for a process that requires fine temperature control or uniform temperature profile. Due to the use of highly conductive metals, the microfibrous media has a near-isothermal temperature profile, as illustrated in examples below.

The present invention is able to work with the current reactors with improved external heat exchanging for the best heat exchanging performance. Microfibrous entrapped catalysts are able to be loaded either in the tube side or the shell side. If in the tube side, the microfibrous entrapped catalyst media is able to be loaded in the tubes in the form of disk, rod or another form. The tube diameter is able to be much larger than these in traditional multi-tubular reactors due to significantly improved heat exchanging rate. Thus the part counts are able to be significantly reduced, and the manufacturing reactor for large scales will be much cheaper and easier than traditional multi-tubular reactor approach. Similarly, metal microfibrous entrapped catalyst is able to also be loaded in shell side in form of disk, pellets, rolls, and other forms.

In order to maintain the optimized contact between microfibrous media and facilitate the loading/uploading into/from the reactor, a microfibrous media assembly is invented. It includes supporting structures (e.g. plates and screens) and the microfibrous media in between. The supporting structures integrate many tiny microfibrous media pieces into a single article, which is easy to load or unload. The structures hold and compress the media, make it uniformly distributed and compressed inside the reactor and well attached to the reactor wall. In some cases, the supported structure also helps to disperse and even take the force on the entire microfibrous media bed due to pressure drop.

It is an object of the subject invention to provide a superior heat transfer from/to gaseous or liquid streams. For this object, highly conductive metal fibers are used to prepare microfibrous entrapped catalysts. These fibers are made of metal or metal alloys with high thermal conductivities, such as copper, silver, aluminum, nickel and their alloys. For particular conditions involving corrosion, micro-sized fiber of special metals or metal alloys (e.g. stainless steel) with lower thermal conductivity will be used. The fiber volume contents are able to be tailored to achieve the optimal heat transfer performance as well as catalytic activity, microfibrous structure integrity, pressure drop, and other characteristics.

The microfibrous media are formed from fibers, with such fibers generally having a diameter of at least 1 micron with the fibers having a diameter which generally does not exceed 32 microns, although smaller or larger diameters are able to be used. A typical fiber volumetric fraction is in the range of 1~10 vol. %. Higher volume fractions are able to also be achieved to enhance the heat transfer for special cases.

The active catalytic materials are able to be catalysts particles, or microfibrous network made of special metals, or coating on the microfibrous network. The catalysts particles are in the form of grains, pellets, extrudates, rings, combinations thereof or others forms. The typical particle size is in the range of 10 microns to 300 microns (0.3 millimeter), although smaller or larger particles are also able to be used. A typical particle volumetric fraction is in the range of 0~20 vol. %. However, higher particle volume fractions are also able to be used.

It is to be understood that the microfibrous entrapped catalysts are able to be comprised of one type of fiber or are able to be comprised of two or more different fibers and the metal fibers are able to have a single diameter or are able to have different diameters. Additionally, the fibers are able to be coated with a thin film of catalyst whereby the mesh support is coated with catalyst in addition to having catalyst fibers or particles retained in interstices of the mesh support.

It is an object of the invention to provide a reaction rate, if not greater than, comparable to that of a traditional packed bed made of pellets or extrudates. In this invention, small catalysts particulates (10~300 micron) are entrapped in the metal microfibrous network. These particulates are too small to fill in a traditional packed bed. Due to the high external surface area and minimized pore diffusion achieved at small particle sizes, the microfibrous entrapped catalysts are able to reach a volumetric reaction rate that is slightly greater than a traditional packed bed, as shown in the examples below.

The present invention provides a general platform to entrap various catalysts for different reactions. It is an object of this invention to provide a microfibrous support structure for retaining and entrapping particulate or fiber materials that are chemically reactive toward a predetermined reactant. The microfibrous entrapped catalysts are able to be initially formed by producing a microfibrous media having a catalyst support retained in the interstices thereof, followed by impregnating the retained support with an appropriate catalyst. Alternatively, the microfibrous media is able to be produced with supported or unsupported catalyst particles in the microfibrous network. Moreover, the microfibrous entrapped catalysts are able to also be produced wherein the particles retained therein are catalyst precursors, which precursors are subsequently converted to an active catalyst. As another alternative example, the microfibrous entrapped catalyst is able to be initially formed and the catalyst or catalyst precursors inserted into the interstices of the microfibrous network after formation of the network.

The microfibrous entrapped catalysts with particles or fibers retained in the interstices thereof are preferably produced by a procedure of the type described in U.S. Pat. No. 5,304,330; 5,080,963; 5,102,745; or 5,096,663, and U.S. Patent Applications 20020068026 and 20050169820, which are all hereby incorporated by reference. Traditional high speed and low cost paper making equipment and techniques are able to be used to prepare the composite material. In such a process, micron-sized diameter metal, polymer, glass, ceramic or other fibers in a variety of compositions and alloys are able to be slurried in an aqueous suspension (along with optional binders, if required) and with the possible use of cellulose fibers and other selected reactant or support particulates such as, but not limited to, alumina support particles. The resulting mixture is able to then be cast into a preformed sheet using a wet-lay process and dried to create a sheet of preformed material. Where a water soluble binder is used in this preparation, drying may be sufficient to fuse the fibers at their junctures, but in the case of those pre-forms utilizing cellulose, subsequent pre-oxidation in an $O_2$ flow at approximately 500° C. for generally about one hour may be employed to remove the bulk of cellulose. Subsequent sintering of the pre-form in an $H_2$ flow at an elevated temperature (700~900° C., depending on the type of fiber) for generally about thirty minutes allows for removal of the remaining cellulosic binder/pore former and entraps the selected support particulates within a sinter-locked network of metal, glass or ceramic fibers.

Figure 2:
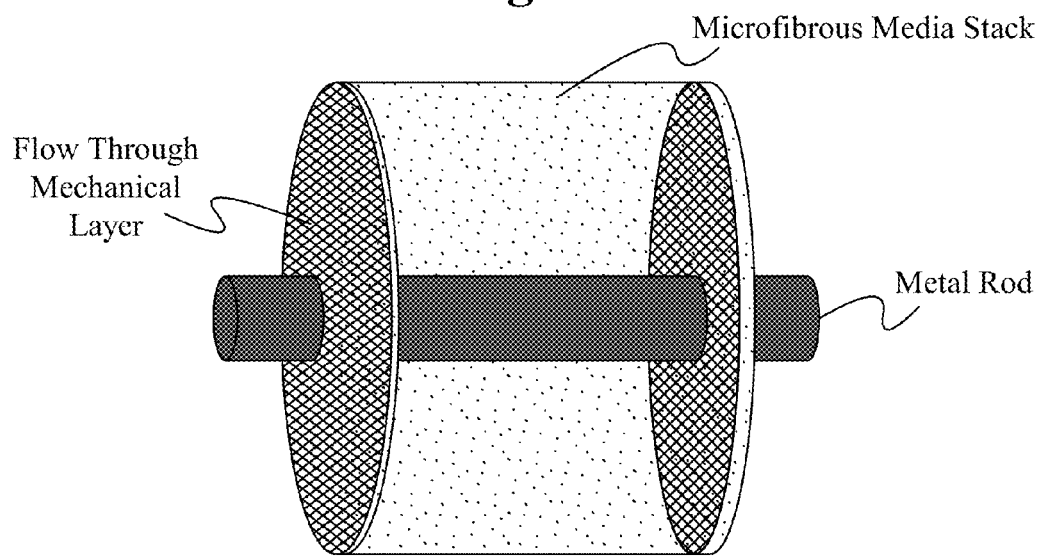
FIG. 2 illustrates a diagram of an example of a microfibrous media assembly according to some embodiments.
Figure 3:
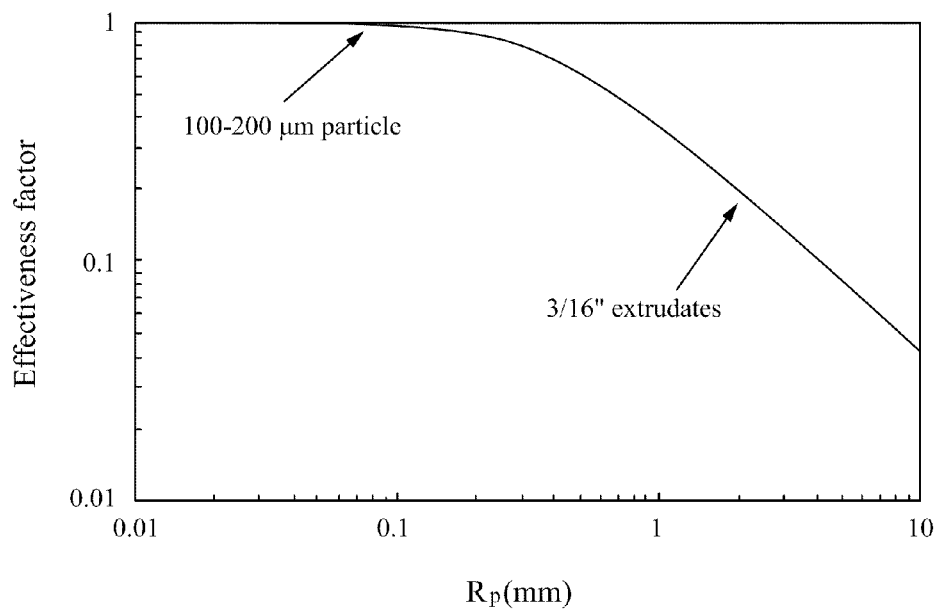
FIG. 3 illustrates a graph of the effectiveness factor versus catalyst particle radius according to some embodiments.

FIG. 1 shows one type of microfibrous media made of copper for highly exothermic and highly endothermic reactions. FIG. 2 describes an example of an assembly of microfibrous media to facilitate packing and unpacking FIG. 3 depicts the reactivity of using small particulates in a microfibrous network for Fischer-Tropsch synthesis. The reaction of Fischer-Tropsch synthesis (FTS) is controlled by pore diffusion. The small particulates of 100-200 micron in size demonstrated an effectiveness factor of approximately 1. The effectiveness factor of 3/16" extrudates widely used in FTS is approximately 0.2. Considering the catalyst fraction of the microfibrous entrapped catalyst is around 0.15, and the catalyst particle volumetric fraction is around 0.6, the catalyst loading in the packed bed is 4 times higher than that in the microfibrous entrapped catalyst. As a result, the reaction rate in the microfibrous entrapped catalyst will be 1.25 times higher than that in the typical packed bed. Similarly, if a reaction is controlled by external mass transfer, the microfibrous entrapped catalyst will provide an even higher reaction rate than typical packed beds due to large external surface area and fast external mass transfer rate. These results suggest the use of microfibrous entrapped catalyst will not hurt the reaction rate even if the active catalyst volumetric loading in microfibrous entrapped catalyst is only ¼ of that in a typical packed bed. This results from the use of small sized particles, which have high external surface area and a high effectiveness factor.

Figure 4:
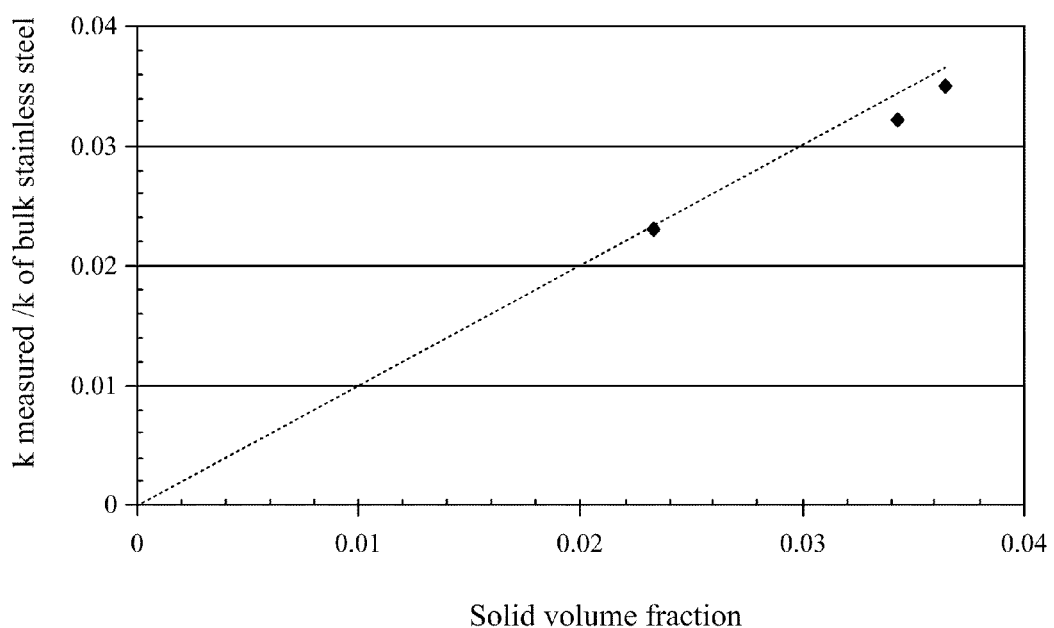
FIG. 4 illustrates a graph of thermal conductivity measured for microfibrous media made of stainless steel at various metal fiber volume fractions according to some embodiments.

FIG. 4 demonstrates the measured thermal conductivity of several stainless steel microfibrous media with various microfiber volumetric fractions. The result indicates that the thermal conductivity of microfibrous media equals the product of thermal conductivity of bulk stainless steel and the volume fraction of stainless steel fibers. The result suggests the thermal conductivity of the microfibrous entrapped catalyst containing microfibers and catalyst particles is able to be calculated using a volumetric weighted average.

Figure 5:
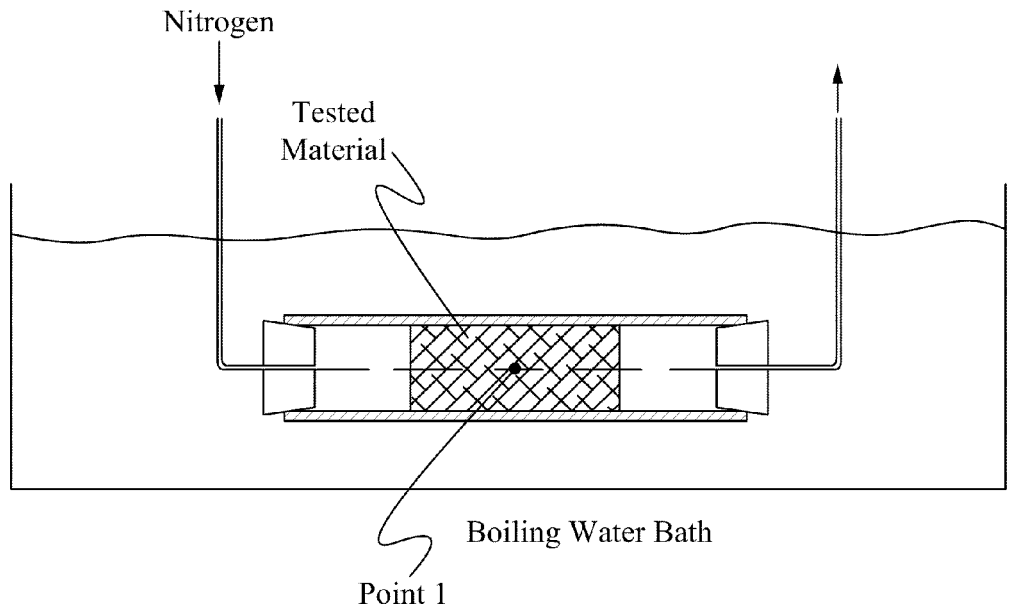
FIG. 5 illustrates a diagram of a test apparatus to verify the improvement in thermal conductivity using metal microfibrous entrapped catalyst according to some embodiments.

FIG. 5 illustrates a test apparatus to experimentally verify the improvement in thermal conductivity of using microfibrous entrapped catalysts. It mainly includes a stainless steel tube and a water bath. The tube had an inner diameter of 1.4 inches and the length is 8 inches. Inside the tube, a fixed bed of test material was loaded at the center of the tube. Several thin thermocouples were buried inside the fixed bed. Both ends of the tube were tightly sealed, preventing the water from contacting the test materials. Only a $N_2$ stream is able to enter the tube. The water bath was maintained at ~92° C.

A packed bed made of $Al_2O_3$ particles (60-80 mesh) and a layer of copper microfiber entrapped $Al_2O_3$ (60-80 mesh) were compared for heat transfer performance at both steady state and transient state. The packed bed was 2 inches long and with a thermal capacity of 10.8 J/K inch of bed. The microfibrous entrapped catalyst contained 5 vol. % copper fibers, and 20% of alumina. The layer of microfibrous entrapped catalyst was also 2 inches long and its thermal capacity is 10.9 J/K inch of bed. The two fixed beds have almost the same thermal capacity, thus all the differences in temperature changes during the test will result from difference in their thermal conductivity. Other packed beds made of mixture of copper powder (60-80 mesh) and the $Al_2O_3$ particles, and microfibrous media beds made of Ni fiber and Stainless Steel fibers were also evaluated.

Figure 6:
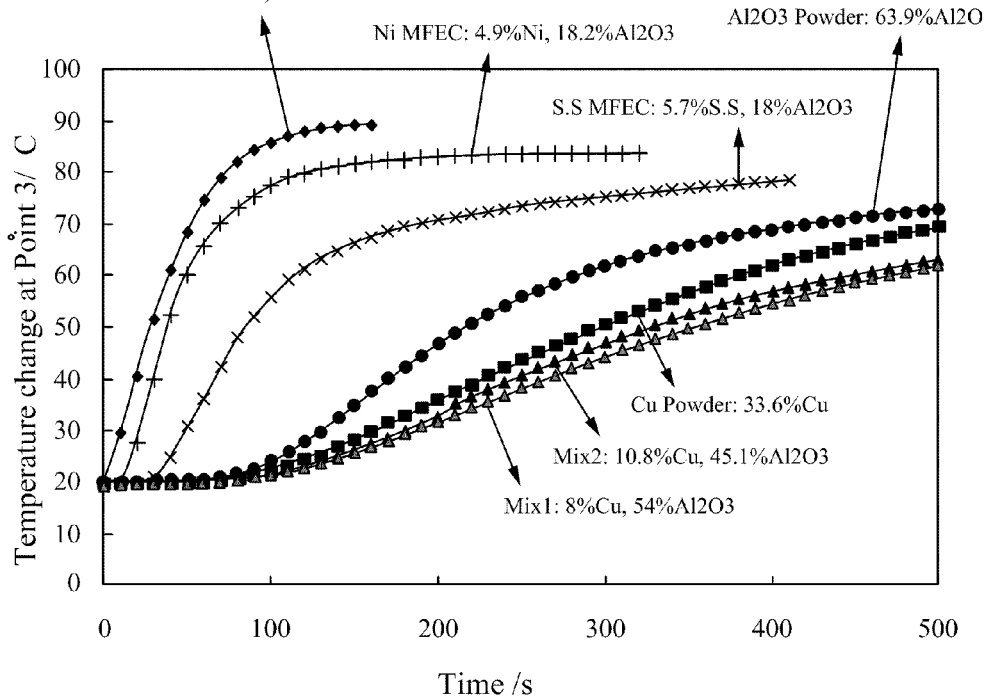
FIG. 6 illustrates a graph of transient performance of using microfibrous entrapped catalyst to improve thermal conductivity according to some embodiments.
Figure 7:
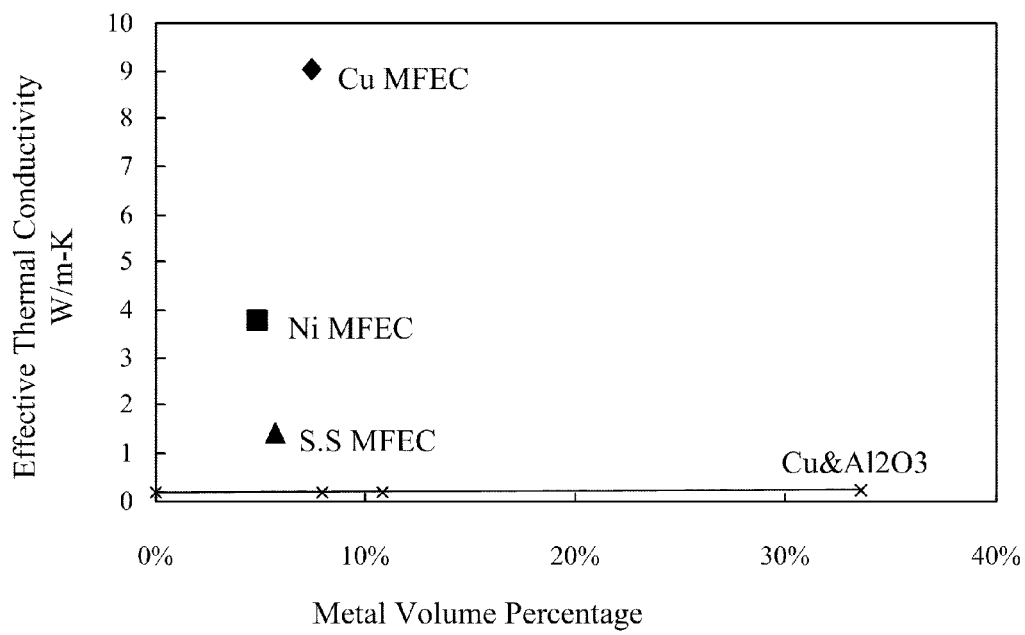
FIG. 7 illustrates a graph of measured effective thermal conductivity in transient tests according to some embodiments.

Two sets of experiments were carried out using this test apparatus. The first set of experiments was carried out for transient state evaluation. During the tests, the test tube was immersed into the water bath at time 0, and the temperatures read by the thermocouple at point "1" were recorded every minute. The temperature time profiles of the packed beds and microfibrous beds are shown in FIG. 6. It is clear that copper microfibrous entrapped catalyst reached 90° C. in about 2 minutes. However, it took the packed bed more than 18 minutes to reach the same temperature. Since the two beds had almost the same thermal capacity, the significant difference suggests that the copper microfibrous entrapped catalyst has a much higher thermal conductivity than the packed bed of alumina. The estimated effective thermal conductivities of these fixed beds are shown in FIG. 7. Copper microfibrous media demonstrated a thermal conductivity of ~10 W/K-m, which is 47 times higher than those of the packed bed made of particles, including the packed bed made of copper powders. The media made of Stainless Steel fibers, which has much lower thermal conductivity compared to copper fiber, also demonstrated a thermal conductivity 17 times higher than those of the packed beds.

Figure 8:
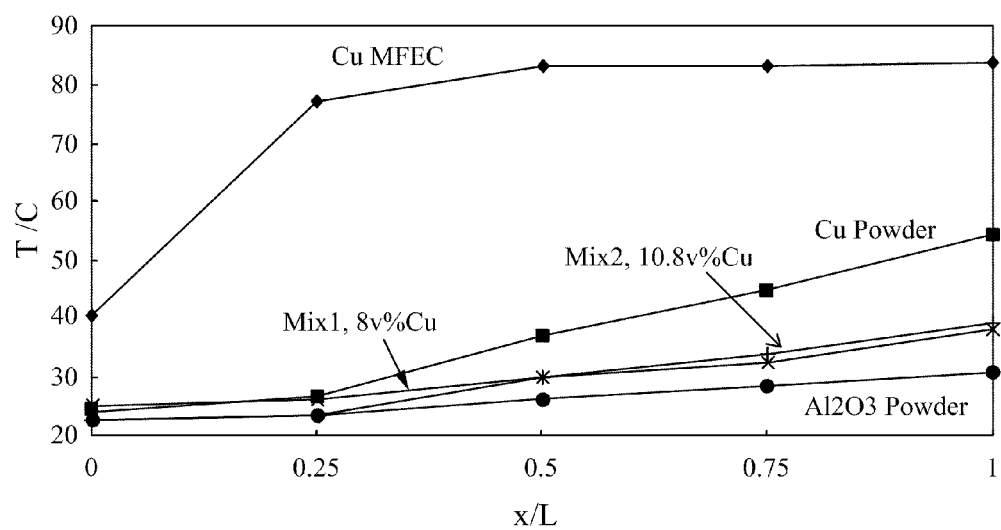
FIG. 8 illustrates a graph of a measure of effective thermal conductivity in steady state tests according to some embodiments.

The second set of experiments evaluates the performance of the two beds at steady state. During the experiments, the tube with a fixed bed loaded was immersed into the water bath. A $N_2$ flow at 18 SLPM was passed through the reactor. The temperatures read by a different thermocouple reached steady state in about 30 minutes. Then the temperatures were recorded every 30 minutes for 2 hours. The temperature at the center-line of the fixed beds is shown in FIG. 8. It is clear that the gas temperature increased very quickly from 40° C. at entrance to near the water batch temperature of 80° C. at the center point (x/L=0.5) of the microfibrous bed. The temperature increase in the case of the $Al_2O_3$ packed bed is only 4° C. The temperature increase of the microfibrous entrapped catalyst is 10 fold higher than that of the packed bed. This suggests metal microfibrous entrapped catalyst has high heat transfer coefficient to transfer the heat from the reactor wall to the stream flowing through the reactor. The averaged heat transfer coefficient of the microfibrous entrapped catalyst is approximately 10 times higher than that of the packed bed. This will significantly benefit highly endothermic reactions, in which a huge amount of heat is required to be transferred into the bed, especially the center, to sustain the reaction. Microfibrous entrapped catalysts will also benefit highly exothermic reactions, in which a huge amount of heat needs to be removed from the bed, especially the center, to keep the reactions under control.

A packed bed made of $Co/Al_2O_3$ catalyst and microfiber media with the same catalyst entrapped were evaluated for Fischer-Tropsch synthesis in a ¾" stainless steel reactor (15 mm id). The experimental conditions are listed in Table 1. Both beds had a volume of 15.7 cc and contained catalyst of 2.5 g (20 vol. % catalyst loading). The packed bed was diluted by $Al_2O_3$ particles. The center-line temperature profile was measured by multipoint thermocouple and is shown in Table 2. The packed bed experiment was carried out at 225° C. and achieved a CO conversion of 0.54. In order to maintain the same conversion, the reactor wall temperature of the microfiber media bed had to be maintained at 235° C. The centerline temperatures of the packed bed were 3-6 times higher than the temperatures in the microfibrous media bed. The microfibrous media bed reached a maximum temperature gradient of 2.1° C. If the heat transfer via thermocouples is taken into consideration, actual temperature gradient inside the packed bed is higher than the measured results. For a FTS reactor with larger diameter, i.e. 2", the temperature gradient will be higher than 30° C. in the packed bed, 10° C. in the microfibrous media bed, according to a conservative estimation. The uniform temperature profile in a microfibrous bed will provide an improved selectivity to desired product. If 30° C. is tolerable, then the microfibrous bed is able to be of a larger diameter thus significantly reducing the required tube numbers to reach the same productivity. Moreover, the microfibrous media bed only utilizes ¼ of catalyst loaded in typical packed bed, as discussed before. As a result, the reactor construction cost will be significantly reduced due to lower part count and less catalyst loading.

TABLE 1

Temperature profile along FTS reactors with a single pass conversion of 0.54.

|  | Packed Bed | Copper MFEC |
|---|---|---|
| flow rate/h$^{-1}$ | 830.4 | 830.4 |
| Wall T/° C. | 225 | 235 |
| Conversion | 0.543 | 0.538 |

TABLE 2

Temperature profiles inside the FTS reactor.

| Point | Location | T/° C. | T-Twall/° C. | T/° C. | T-Twall/° C. |
|---|---|---|---|---|---|
| Gas | 1 | 216.4 | −8.6 | 226.5 | −8.5 |
| Heat | 2 | 219.6 | −5.4 | 228.5 | −6.5 |
| Up | 3 | 222.6 | −2.4 | 232.2 | −2.8 |
|  | 4 | 228.7 | 3.7 | 234.9 | −0.1 |
| Reaction | 5 | 231.9 | 6.9 | 237.1 | 2.1 |
| Section | 6 | 229.5 | 4.5 | 235.8 | 0.8 |
| Average 4~6 |  | 230.03 | 5.03 | 235.93 | 0.93 |

To utilize the microfibrous media, the microfibrous media is used in a desired implementation such as a container for a sorption process, a container for a catalytic reaction process, a component in a high efficiency heat exchanger, a thermal sink or phase change thermal modulator, part of an electrochemcial reactor or a static mixture. Depending on the implementation, the microfibrous media is used accordingly. Common to the implementations is the improved thermal conductivity and heat transfer.

In operation, the microfibrous media enhances intra-bed heat transfer characteristics. Microfibrous entrapped catalysts have a much higher thermal conductivity and a higher heat transfer co-efficient than a traditional packed bed due to the use of highly conductive micron-sized metal fibers and improved wall contacting. Since microfibrous media entraps fine catalyst particles, the microfibrous entrapped catalysts have a similar reaction rate at a much lower catalyst loading than the traditional packed bed. By changing the active entrapped catalyst, microfibrous media is able to be applied to different highly exothermic and highly endothermic reactions/processes, and reactions/processes that utilize fine temperature control or uniform temperature profile.

Some embodiments of the invention are described herein.

In some embodiments, an internal packing that enhances external transport into or out of a vessel. The packing promotes heat transfer. The packing promotes electrical conduction. The packing is malleable to promote good internal contacting to itself and to the internal walls of the vessel. The vessel is sealed. The vessel is a flow through design, or periodically opened, closed, or the flow is variable in flow rate or direction. The vessel is tubular, rectangular, conical or of some other cross-sectional description or form factor. The vessel serves as a container for a sorption process. The vessel serves as a container for a catalytic reaction process. The vessel serves as a component in a high efficiency heat exchanger. The vessel serves as a thermal sink or phase change thermal moderator. The vessel is part of an electrochemical reactor. The vessel serves as a static mixer. The packing includes high thermal conductivity fibers. The packing includes fibers with high electrical conductivity. The fibers are used to immobilize a sorbent. The fibers are used to immobilize a catalyst. The fibers are used to immobilize an electrocatalyst. The fibers are used to infiltrate a phase change medium. The fibers are fused at their junctures to promote heat transfer or electrical conduction. The dimensions of the fibers and immobilized phase are chosen to minimize pressure drop. The dimensions of the fibers and immobilized phase are chosen to promote high levels of volumetric reactivity. The fiber diameter and composition are selected to promote high levels of heat transfer at the inside wall of the vessel. The fiber diameter and composition are selected to promote high levels of electrical conduction and low contact resistance at the inside wall of the vessel. The orientation of the packing is selected to promote heat transfer or electrical conduction in a specific direction. The volume fractions of the conduction aid and the immobilized phase are adjustable over wide ranges. The fibers are of different diameters. The packing and entrapped phase are spatially graded. The diameter, volume loading and composition of the fibers and the immobilized phase are optimized to promote the rate of reaction and/or sorption per unit of pressure drop. The diameter, volume loading and composition of the fibers and the immobilized phase are optimized to minimize the intravessel temperature gradient within the reaction and/or sorption vessel at a specified level of volumetric reactivity. The diameter of the fibers and immobilized phase are optimized to promote the rate of electrochemical reaction per unit of electrical resistance. The diameter, volume loading and composition of the fibers and immobilized phase are optimized to minimize the intravessel electrical resistance at a specified level of volumetric reactivity. The medium in the vessel in contact with the packing is a gas. The medium in the vessel in contact with the packing is a liquid. The medium in the vessel in contact with the packing is a two phase mixture of liquid and gas. The medium in the vessel in contact with the packing undergoes a phase change. The process occurring is exothermic or endothermic. The rate of the process occurring in the vessel depends on temperature. The selectivity of the process occurring in the vessel depends on temperature. The internal packing helps remove exotherms or endotherms associated with sorption, desorption, or steady-state catalytic or electrochemical reaction. The packing helps remove heat and reduce thermal excursions associated with nonsteady-state heterogeneous reactions such as catalyst regeneration, calcinations, oxidations and autoreductions. The intrapacking Reynold's number is low and lies in a regime of non-turbulent flow. The intrapacking Reynold's number is high and lies in a regime of turbulent flow. The volume fraction of catalyst, sorbent or electrocatalyst is higher than that which can be attained in a fixed bed reactor of a packed bed or monolithic design. The level of reaction and heat transfer are similar to a fluid bed reactor but in the absence of back mixing. The position of the immobilized solid reactive phase does not depend on gravitational orientation or fluid velocity versus particulate drag forces. The volume fraction and diameter of the fibers are selected to entrap solids of a selected particle size. The vessel permits higher levels of chemical conversion per pass or per cycle. The vessel permits higher levels of chemical conversion per pass with the lowest possible temperature gradient within the internal packing. The packing is stacked or layered onto an assembly apparatus to facilitate packing, unpacking or maintenance of the vessel. Intermediate inert mechanical layers are used to maintain the malleable packing at a selected volume fraction and mechanical loading. Layers of the packing material are stacked in a specific order to promote process integration and process intensification. The profile and cut patterns within the layers are selected to promote fluid contacting, mixing and prescribed fluid movement within the internal packing. The structure of the apparatus is used to mount various sensors such as thermocouples, chemical sensors, flow sensors, pressure sensors and other sensors. The output of the sensors is used to control the process to promote: economics, safety, environmental compliance and process throughput per unit of: volume, mass or energy. An apparatus includes multiple vessels within a common manifold, and operated similar to a "tube" and shell heat exchanger. The vessels are not tubular but adhere to the specified form factors. The heat is transferred in a co-current fashion. The heat is transferred in a counter-current fashion. The number of individual vessels is reduced (at constant volume of the entrapped media) by making each vessel larger and still maintaining adequate thermal control due to the enhanced conductivity of the media. The individual vessels are not located within a common manifold but operate individually. The number of vessels is significantly reduced because they can be made of larger volume and still provide adequate heat transfer properties at a fixed level of chemical processing throughput. The vessels are made shorter in the axial flow direction because heat is transferred more effectively and temperature sensitive equilibrium limited reactions occur to a greater and more desirable degree. The performance attributes and compositions of the catalyst, electrocatalyst or sorbent are specifically selected in a non-obvious manner to take advantage of the enhanced transport properties and intramedia operating temperature specific to the process and assemblage network of the vessels.

In some embodiments, a microfibrous reactor for highly exothermic and highly endothermic reactions/processes comprises a reactor tube packed with microfibrous media made of highly thermal conductive micron-sized fibers or assemblies made of the microfibrous media. A fluid perpendicularly or near-perpendicularly passes through the microfibrous media inside the reactor. The thermal conductive microfibrous media transfers the heat from the fluid to the reactor wall for exothermic reaction/processes, and from the reactor wall to the fluid for endothermic reaction/processes. The reactor tube is made of metal and other thermal conductive materials, which may be, but are not limited to, metals, metal alloys, C, Si, SiC. The microfibrous media comprises approximately 1~25 vol. % of micron-sized fibers and 0~60 vol. % of catalyst or sorbent/adsorbent materials. The micron-sized fibers are fibers made from metal with high thermal conductivities. These metals may be, but are not limited to, silver, copper, aluminum, nickel, iron, titanium, chromium, and metal alloys of these metals. The micron-sized fibers are fibers made from non-metal materials with high thermal conductivities. These materials may be, but are not limited to, C, Si and SiC. The micron-sized fibers have an average diameter of about 1~30 microns, though fibers with larger diameters may also be used. The catalytic materials are entrapped catalyst particles, active coating layers on the micron sized fibers, and/or the active surface areas of the metal fibers themselves. The sorbent/adsorbent materials are entrapped sorbent/adsorbent particles, active coating layers on the micron sized fibers, and/or the metal fibers themselves. The catalyst particles and sorbent/adsorbent particles have an average diameter of 10~300 microns, though smaller or larger particles may also be used. The catalyst particles and sorbent/adsorbent particles are in the form of powder, grains, pellets, extrudates, rings, or combinations thereof. The microfibrous media is in the form of a stack (or stacks) of disks in reactors of axial flow direction, and rolls in the reactors of radial flow direction so that the flow direction is perpendicular or near-perpendicular to layers of microfibrous entrapped catalyst. Other shapes such as spheres, fussy pellets, and other complex three dimensional structures, or various combinations thereof may also be used. The assembly of microfibrous media includes microfibrous media in various shapes and supporting structures. The supporting structures hold and compress the microfibrous media to attach the reactor wall, and facilitate loading the microfibrous media into the reactor and unloading the media out from the reactor, especially when the reactor is long. The reactors packed with microfibrous entrapped catalysts provide improved heat transfer means for highly exothermic and highly endothermic reactions/processes, and reactions/processes that need fine temperature control and uniform temperature profile. The microfibrous entrapped catalysts transfer heat (generated/ or consumed) from the reaction/catalyst zone to the outer wall (in an e.g., tubular reactor), where other heat transfer fluids or measures are employed to remove/add required heat in order to maintain an optimal reactor temperature and temperature profile for highly selective and/or high volume reactivity applications. The microfibrous entrapped catalysts transfer heat to/from the reaction zone, where endothermic/exothermic reactions take place. The exothermic reactions/processes include, but are not limited to, Fischer-Tropsch synthesis for hydrocarbons, methanation, methanol formation and other alcohol synthesis using carbon monoxide and hydrogen, gas-to-liquid (GTL), coal-to-liquid (CTL) processes, biomass-to-liquid (BTL) processes, hydrocarbon partial oxidation reactions, ammonia synthesis, adsorption, air compression, and others. The endothermic reactions/processes include, but are not limited to, steam reforming, and ammonia decomposition, reactor cooling and others. The reactions/processes include both homogeneous and heterogeneous reactions/processes. The fluid is able to be gaseous and/or liquid. The structured catalyst material where the volumetric loading of either catalyst or metal fiber, or both, is spatially graded across the cross-section or other defining coordinate system so as to optimally adjust heat transport through the fibers versus heat generation/removal at the catalyst surface. The structured catalyst wherein the fiber hardness, media compressibility, fiber diameter, or other physical means are chosen to increase the number of fiber contacts at the interior wall of the reactor thereby increasing the critical interior wall heat transfer coefficient. A heterogeneous reactive structure wherein the catalyst is replaced by a chemical adsorbent or absorbent which is also used for either an endothermic or exothermic chemical separation process. A metal fiber entrapped chemical reactant which is either consumed or produced during the course of the reaction, is accommodated within a conductive metal fiber matrix so as to achieve appropriate and desired temperatures during the course of the chemical reaction. A general reactor design process and reactor wherein the ratio of heat generating/removing materials and reactions are balanced against the inclusion and distribution of conductive metal fibers so as to better optimize and improve the general performance of the process. The reactor design process wherein the goal of the optimization may include on or more of the following: lowest annualized operating cost, highest single pass conversion, greatest selectivity to a desired product, lowest selectivity to an undesired product, smallest and/or lightest reactor, smallest and lightest balance-of-plant (including the summation of other process units and unit operations) for a more complex process flow sheet that is driven by both the reactor performance itself as well as other required separations, recycle streams, product specifications and others. A structured reactive material wherein the number of individual reactor tubes can be significantly reduced because they can be made larger in diameter (and still maintain appropriate temperature control) due to the presence of the conductive fibers. The structured material wherein the metal fibers are replaced by other high thermal conductivity fibers including: polycrystalline diamond, graphites, diamond coated fibers, silicon carbides, sapphire, and other polymers, inorganics or composites and coatings thereof. A generalized methodology of improved chemical reaction process control that is accomplished by one or more temperature sensors, or chemical reactant/product composition sensors that are embedded in a reactive structure and which can utilize optimized feedback process control in order to achieves and realize various process optimization goals.

In some embodiments, an internal packing that enhances external transport out of (or into) a vessel comprises microfibrous media made of highly thermal conductive micron-sized fibers or assemblies made of the microfibrous media for exothermic (or endothermic) reactions/processes. A fluid perpendicularly or near-perpendicularly passes through the internal packing inside the vessel. The packing promotes heat transfer. The packing promotes electrical conduction. The packing is malleable to promote good internal contacting to itself and to the internal walls of the vessel. The vessel is sealed. The vessel is a flow through design, or periodically opened, closed, or the flow is variable in flow rate or direction. The vessel is tubular, rectangular, conical or of some other cross-sectional description or form factor. The vessel serves as a container for a sorption process. The vessel serves as a container for a catalytic reaction process. The vessel serves as a component in a high efficiency heat exchanger. The vessel serves as a thermal sink or phase change thermal moderator. The vessel is part of an electrochemical reactor. The vessel serves as a static mixer. The vessel is made of metal and other thermal conductive materials, which may be, but are not limited to, metals, metal alloys, C, Si, SiC and other ceramics. The microfibrous media comprises approximately 1~25 vol.

% of micron-sized fibers and 0~60 vol. % of catalyst or sorbent/adsorbent materials as immobilized phase. The packing and entrapped phase are spatially graded. The micron-sized fibers are fibers made from metal with high thermal conductivities. These metals may be, but are not limited to, silver, copper, aluminum, nickel, iron, titanium, chromium, and metal alloys of these metals. The fibers made from non-metal materials with high thermal conductivities. These materials may be, but are not limited to C, Si, SiC, aluminum nitride and boron nitride. The micron-sized fiber are fibers with high electrical conductivity. The micron-sized fibers have an average diameter of about 1~30 microns, though fibers with larger diameters may also be used. The micron-sized fibers have different diameters. The fibers are fused at their junctures to promote heat transfer or electrical conduction. The catalytic materials include entrapped catalyst particles, active coating layers on the micron sized fibers, and/or the active surface areas of the metal fibers themselves. The sorbent/adsorbent materials include entrapped sorbent/adsorbent particles, active coating layers on the micron sized fibers, and/or the metal fibers themselves. The catalyst particles and sorbent/adsorbent particles have an average diameter of 10~300 microns, though smaller or larger particles may also be used. The catalyst particles and sorbent/adsorbent particles are in the form of powder, grains, pellets, extrudates, rings, or combinations thereof. The fibers are used to immobilize a sorbent. The fibers are used to immobilize a catalyst. The fibers are used to immobilize an electrocatalyst. The fibers are used to infiltrate a phase change medium. The fibers and microfibrous media are used to transfer heat between the fluid and vessel wall by conduction. The fibers and microfibrous media are used to promote the heat transfer between the fluid and vessel wall. The dimensions of the fibers and immobilized phase are chosen to minimize pressure drop. The dimensions of the fibers and immobilized phase are chosen to promote high levels of volumetric reactivity. The fiber diameter and composition are selected to promote high levels of heat transfer at the inside wall of the vessel. The fiber diameter and composition are selected to promote high levels of electrical conduction and low contact resistance at the inside wall of the vessel. The orientation of the packing is selected to promote heat transfer or electrical conduction in a specific direction. The volume fractions of the conduction aid and the immobilized phase are adjustable over wide ranges. The diameter, volume fraction and composition of the fibers and the immobilized phase are optimized to promote the rate of reaction and/or sorption per unit of pressure drop. The diameter, volume loading and composition of the fibers and the immobilized phase are optimized to minimize the intravessel temperature gradient within the reaction and/or sorption vessel at a specified level of volumetric reactivity. The diameter of the fibers and immobilized phase are optimized to promote the rate of electrochemical reaction per unit of electrical resistance. The diameter, volume loading and composition of the fibers and immobilized phase are optimized to minimize the intravessel electrical resistance at a specified level of volumetric reactivity. The microfibrous media is in the form of a stack (or stacks) of disks in reactors of axial flow direction, and rolls in the reactors of radial flow direction so that the fluid flow direction is perpendicular or near-perpendicular to layers of microfibrous entrapped catalyst. Other shapes such as spheres, fussy pellets, and other complex three dimensional structures, or various combinations thereof may also be used. The internal packing assembly includes microfibrous media in various shapes as described in Claim 11 stacked or layered on supporting structures. The supporting structures hold and compress the microfibrous media to attach the reactor wall, and facilitate packing, unpacking or maintenance of the vessel, especially when the vessel is long. The internal packing assembly where intermediate inert mechanical layers are used to maintain the malleable packing at a selected volume fraction and mechanical loading. The internal packing assembly where layers of the packing material are stacked in a specific order to promote process integration and process intensification. The internal mechanical packaging layers where the profile and cut patterns within the layers are selected to promote fluid contacting, mixing and prescribed fluid movement within the internal packing. The structure of the apparatus is used to mount various sensors such as thermocouples, chemical sensors, flow sensors, pressure sensors and other sensors. The output of the sensors are used to control the process to promote: economics, safety, environmental compliance and process thoroughput per unit of volume, mass or energy input. The reactors packed with microfibrous entrapped catalysts provide improved heat transfer means for highly exothermic and highly endothermic reactions/processes, and reactions/processes that need fine temperature control and uniform temperature profile. The microfibrous entrapped catalysts transfer heat (generated/ or consumed) from the reaction/catalyst zone to the outer wall (in an e.g., tubular reactor), where other heat transfer fluids or measures are employed to remove/add required heat in order to maintain an optimal reactor temperature and temperature profile for highly selective and/or high volume reactivity applications. The microfibrous entrapped catalysts transfer heat to/from the reaction zone, where endothermic/exothermic reactions take place. The rate of the process occurring in the vessel depends on temperature. The selectivity of the process occurring in the vessel depends on temperature. The internal packing helps remove exotherms or endotherms associated with sorption, desorption, or steady-state catalytic or electrochemical reaction. The packing helps remove heat and reduce thermal excursions associated with nonsteady-state heterogeneous reactions such as catalyst regeneration, calcinations, oxidations and autoreductions. The exothermic reactions/processes include, but are not limited to, Fischer-Tropsch synthesis for hydrocarbons, methanation, methanol formation and other alcohol synthesis using carbon monoxide and hydrogen, gas-to-liquid (GTL), coal-to-liquid (CTL) processes, biomass-to-liquid (BTL) processes, hydrocarbon partial oxidation reactions, ammonia synthesis, adsorption, air compression and others. The endothermic reactions/processes include, but are not limited to, steam reforming, and ammonia decomposition, reactor cooling and others. The reactions/processes include both homogeneous and heterogeneous reactions/processes. The fluid can be gas, vapor, liquid, plasma, a phase undergoing phase change and a multiple-phase mixture of above mentioned phases. The structured catalyst material where the volumetric loading of either catalyst or metal fiber, or both, is spatially graded across the cross-section or other defining coordinate system so as to optimally adjust heat transport through the fibers versus heat generation/removal at the catalyst surface. The structured catalyst wherein the fiber hardness, media compressibility, fiber diameter, or other physical means are chosen to increase the number of fiber contacts at the interior wall of the reactor thereby increasing the critical interior wall heat transfer coefficient. A heterogeneous reactive structure wherein the catalyst is replaced by a chemical adsorbent or absorbent which is also used for either an endothermic or exothermic chemical separation process. A metal fiber entrapped chemical reactant which is either consumed or produced during the course of the reaction, is accommodated within a conductive metal fiber matrix so as to achieve appropriate and desired temperatures during the course of the chemical reaction. A general reactor design process and reactor wherein the ratio of heat generating/removing materials and reactions are balanced against the inclusion and distribution of conductive metal fibers so as to better optimize and improve the general performance of the process. The reactor design process wherein the goal of the optimization may include on or more of the following: lowest annualized operating cost, highest single pass conversion, greatest selectivity to a desired product, lowest selectivity to an undesired product, smallest and/or lightest reactor, smallest and lightest balance-of-plant (including the summation of other process units and unit operations) for a more complex process flow sheet that is driven by both the reactor performance itself as well as other required separations, recycle streams, product specifications, and others. A structured reactive material wherein the number of individual reactor tubes can be significantly reduced because they can be made larger in diameter (and still maintain appropriate temperature control) due to the presence of the conductive fibers. The structured material wherein the metal fibers are replaced by other high thermal conductivity fibers including: polycrystalline diamond, graphites, diamond coated fibers, silicon carbides, sapphire, and other polymers, inorganics or composites and coatings thereof. A generalized methodology of improved chemical reaction process control that is accomplished by one or more temperature sensors, or chemical reactant/product composition sensors that are embedded in a reactive structure and which can utilize optimized feedback process control in order to achieves and realize various process optimization goals. The intrapacking Reynold's number is low (less than 20) and lies in a regime of non-turbulent flow. The intrapacking Reynold's number is high (greater than 1500) and lies in a regime of turbulent flow. The volume fraction of catalyst, sorbent or electrocatalyst is higher than that which can be attained in a fixed bed reactor of a packed bed or monolithic design. The level of reaction and heat transfer are similar to a fluid bed reactor but in the absence of back mixing. The position of the immobilized solid reactive phase does not depend on gravitational orientation or fluid velocity versus particulate drag forces. The volume fraction and diameter of the fibers are selected to entrap solids of a selected particle size. The vessel permits higher levels of chemical conversion per pass or per cycle. The vessel permits higher levels of chemical conversion per pass with the lowest possible temperature gradient within the internal packing. The packing is stacked or layered onto an assembly apparatus to facilitate packing, unpacking or maintenance of the vessel. Intermediate inert mechanical layers are used to maintain the malleable packing at a selected volume fraction and mechanical loading. Layers of the packing material are stacked in a specific order to promote process integration and process intensification. The profile and cut patterns within the layers are selected to promote fluid contacting, mixing and prescribed fluid movement within the internal packing. The structure of the apparatus is used to mount various sensors such as thermocouples, chemical sensors, flow sensors, pressure sensors, and other sensors. The output of the sensors are used to control the process to promote: economics, safety, environmental compliance and process throughput per unit of: volume, mass or energy.

In some embodiments, an apparatus comprised of multiple vessels within a common manifold, and operated similar to a "tube" and shell heat exchanger. The vessels are not tubular but adhere to specified form factors. The heat is transferred in a co-current fashion. The heat is transferred in a counter-current fashion. The number of individual vessels is reduced (at constant volume of the entrapped media) by making each vessel larger and still maintaining adequate thermal control due to the enhanced conductivity of the media. The individual vessels are not located within a common manifold but operate individually. The number of vessels is significantly reduced because they can be made of larger volume and still provide adequate heat transfer properties at a fixed level of chemical processing throughput. The vessels are made shorter in the axial flow direction because heat is transferred more effectively and temperature sensitive equilibrium limited reactions occur to a greater and more desirable degree. The performance attributes and compositions of the catalyst, electrocatalyst or sorbent are specifically selected in a non-obvious manner to take advantage of the enhanced transport properties and intra-media operating temperature specific to the process and assemblage network of the vessels.

Although a catalyst has been described throughout, a sorbent, an electrocatalyst and/or other chemically reactive materials are also able to be used in addition to or instead of a catalyst.

Additional objects and advantages of the invention are set forth in, or will be apparent to those of ordinary skill in the art from, the detailed description as follows. Also, it should be further appreciated that modifications and variations to the specifically illustrated and discussed features and materials hereof may be practiced in various embodiments and uses of this invention without departing from the spirit and scope thereof, by virtue of present reference thereto. Such variations may include, but are not limited to, substitutions of the equivalent means, features, and materials for those shown or discussed, and the functional or positional reversal of various parts, features, or the like.

Still further, it is to be understood that different embodiments, as well as different presently preferred embodiments, of this invention, may include various combinations or configurations of presently disclosed features, elements, or their equivalents (including combinations of features or configurations thereof not expressly shown in the figures or stated in the detailed description).

These and other features, aspects and advantages of the present invention will become better understood with reference to the following descriptions and appended claims. The accompanying drawings, which are incorporated in and constitute a part of this specification, illustrate an embodiment of the invention and, together with the descriptions, serve to explain the principles of the invention.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A system comprising:
a. a vessel;
b. an internal packing for enhancing external heat transport into or out of the vessel, the internal packing comprising a microfibrous media made of thermally conductive fibers, wherein an orientation of the internal packing is configured for promoting heat transfer or electrical conduction in a specific direction; and
c. a microfibrous immobilized process and chemical reaction facilitator contained within the internal packing, wherein the microfibrous entrapped process and reaction facilitator increases heat transport and electrical conduction.

2. The internal packing of claim 1 wherein the fibers are selected from the group consisting of silver, zinc, copper, aluminum, nickel, iron, titanium and chromium.

3. The internal packing of claim 1 wherein the thermally conductive fibers are micron-sized.

4. The internal packing of claim 1 wherein the packing is malleable to promote internal contact to internal walls of the vessel.

5. The internal packing of claim 1 wherein the vessel is sealed.

6. The internal packing of claim 1 wherein the vessel is a flow through design, periodically opened, closed or the flow is variable in flow rate or direction.

7. The internal packing of claim 1 wherein the vessel is tubular, rectangular or conical.

8. The internal packing of claim 1 wherein the vessel comprises a container for an entrapped sorbent.

9. The internal packing of claim 1 wherein the vessel comprises a container for an entrapped catalyst.

10. The internal packing of claim 1 wherein the vessel serves as a component in a high efficiency heat exchanger.

11. The internal packing of claim 1 wherein the vessel serves as a thermal sink or phase change thermal moderator.

12. The internal packing of claim 1 wherein the vessel serves as a static mixer.

13. The internal packing of claim 1 wherein the fibers comprise high electrical conductivity.

14. The internal packing of claim 1 wherein the fibers are configured to immobilize a sorbent.

15. The internal packing of claim 1 wherein the fibers are configured to immobilize a catalyst.

16. The internal packing of claim 1 wherein the fibers are configured to immobilize an electro catalyst.

17. The internal packing of claim 1 wherein volume fractions of conduction aid and an immobilized phase are adjusted over ranges.

18. The internal packing of claim 1 wherein the packing is spatially graded.

19. The internal packing of claim 1 wherein the fibers are fused at their junctures to promote heat transfer or electrical conduction.

20. The internal packing of claim 1 wherein a medium in the vessel in contact with the packing is a liquid, a gas, a two phase mixture of liquid and gas, multiple phases of liquids, or multiple phases of liquids and a gas.

21. The internal packing of claim 1 wherein a medium in the vessel in contact with the packing undergoes a phase change.

22. The internal packing of claim 1 wherein selectivity of a process occurring in the vessel depends on temperature.

23. The internal packing of claim 1 wherein the thermally conductive fibers are stacked in layers.

24. The internal packing of claim 1 wherein the packing helps transport heat and reduce thermal excursions associated with nonsteady-state heterogeneous reactions including catalyst regenerations, calcinations, oxidations and autoreductions.

25. The internal packing of claim 1 wherein the packing is stacked or layered onto an assembly apparatus to facilitate packing, unpacking or maintenance of the vessel.

26. The internal packing of claim 1 wherein the internal packing is configured to mount one or more sensors including thermocouples, chemical sensors, flow sensors, or pressure sensors.

27. A vessel containing:
a. a microfibrous media made of thermally conductive fibers; and
b. a microfibrous immobilized process and chemical reaction facilitator contained within the microfibrous media, wherein the microfibrous media and the microfibrous entrapped process and reaction facilitator increase heat transfer and electrical conduction, further wherein an orientation of the microfibrous media is configured for promoting heat transfer or electrical conduction in a specific direction.

28. The vessel of claim 27 wherein the process and reaction facilitator is selected from the group consisting of a catalyst, a sorbent and a chemically reactive material.

29. The vessel of claim 27 wherein the fibers are configured to immobilize a sorbent.

30. The vessel of claim 27 wherein the fibers are configured to immobilize a catalyst.

31. The vessel of claim 27 wherein the fibers are non-metal.

32. The vessel of claim 27 wherein the thermally conductive fibers are micron-sized.

33. The vessel of claim 27 wherein the microfibrous media is malleable.

34. The vessel of claim 27 wherein a fluid perpendicularly or near-perpendicularly passes through the microfibrous media inside the vessel and the thermally conductive microfibrous media transfers the heat from the fluid to the vessel wall for exothermic reaction/processes, and from the vessel wall to the fluid for endothermic reaction/processes.

35. The vessel of claim 27 wherein the microfibrous media is configured as a tube made of at least one of a metal, a metal alloy, carbon, silicon and silicon carbide.

36. The vessel of claim 27 wherein the microfibrous media comprises a catalyst.

37. The vessel of claim 36 wherein the microfibrous media comprises approximately 1-25% the fibers by volume and approximately 0-60% the catalyst by volume.

38. The vessel of claim 36 wherein the catalyst comprise particles of a diameter of approximately 10-300 microns.

39. The vessel of claim 36 wherein the catalyst is in a form of powder, grains, pellets, extrudates, rings, or combinations thereof.

40. The vessel of claim 36 wherein the microfibrous media is in a stack of disks in vessels of axial flow direction, and rolls in the vessels of radial flow direction so that the flow direction is perpendicular or near-perpendicular to layers of the media.

41. The vessel of claim 27 wherein the fibers are made of a metal with high thermal conductivity.

42. The vessel of claim 41 wherein the metal is selected from the group consisting of silver, zinc, copper, aluminum, nickel, iron, titanium, chromium, and metal alloys thereof.

43. The vessel of claim 27 wherein the fibers are made of a non-metal material with high thermal conductivities selected from the group consisting of carbon, silicon, silicon carbide, aluminum nitride and boron nitride.

44. The vessel of claim 27 wherein the fibers comprise a diameter of approximately 1-30 microns.

45. The vessel of claim 27 wherein the fibers are thermal conductivity fibers selected from the group consisting of polycrystalline diamond, graphites, diamond coated fibers, silicon carbides, sapphire, and other polymers, inorganics, composites and coatings thereof.

46. The vessel of claim 27 further comprising one or more sensors coupled to the vessel, wherein the one or more sensors are used to control a process.

47. The vessel of claim 27 wherein the size of the vessel maintains adequate thermal control due to the enhanced conductivity of the media in the radial direction.

* * * * *